(12) United States Patent
Yokoyama

(10) Patent No.: US 6,573,939 B1
(45) Date of Patent: Jun. 3, 2003

(54) DIGITAL CAMERA HAVING SYNCHRONIZED MOVEMENT OF LENS AND FLASH

(75) Inventor: Kouji Yokoyama, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/033,073

(22) Filed: Mar. 2, 1998

(30) Foreign Application Priority Data

Feb. 28, 1997 (JP) .............................................. 9-062337
Mar. 14, 1997 (JP) .............................................. 9-082258

(51) Int. Cl.⁷ ............................................. H04N 5/225
(52) U.S. Cl. .................. 348/375; 348/333.06; 348/371; 348/373; 396/175; 396/535
(58) Field of Search ...................... 348/333.06, 333.07, 348/373, 374, 375, 376, 370, 371, 372, 211.14; 396/61, 62, 155, 174, 175, 535, 541, 205; D16/209, 239

(56) References Cited

U.S. PATENT DOCUMENTS

| | | | | |
|---|---|---|---|---|
| 5,276,473 A | * | 1/1994 | Stephenson, III | ........... 396/174 |
| 5,444,486 A | * | 8/1995 | Mizuno et al. | ............. 348/370 |
| 5,559,554 A | * | 9/1996 | Uekane et al. | ......... 348/333.02 |
| 5,655,170 A | * | 8/1997 | Yamamoto et al. | .... 348/207.99 |
| 5,903,706 A | * | 5/1999 | Wakabayashi et al. | ...... 348/373 |
| 6,141,505 A | * | 10/2000 | Miyata et al. | ............... 348/376 |
| 6,295,088 B1 | * | 9/2001 | Tsukahara et al. | ..... 348/333.06 |
| 6,411,332 B1 | * | 6/2002 | Whitby et al. | ............... 348/373 |

FOREIGN PATENT DOCUMENTS

| | | | | |
|---|---|---|---|---|
| JP | 8-29835 | 2/1996 | | |
| JP | 8-36207 | 2/1996 | | |
| JP | 11183981 A | * | 7/1999 | ........... G03B/15/05 |
| JP | 2001-268419 A | * | 9/2001 | .......... H04N/5/225 |

* cited by examiner

*Primary Examiner*—Andrew Christensen
*Assistant Examiner*—Eric Wisdahl
(74) *Attorney, Agent, or Firm*—Oblon, Spivak, McClelland, Maier & Neustadt, P.C.

(57) ABSTRACT

A digital camera having a camera body and a lens assembly within an imaging unit which is rotatably connected to the camera body. Rotation of the imaging unit containing the lens assembly with respect to the position of the camera body causes the flash within the camera body to follow the direction at which the lens assembly is aimed. If the camera has a self-portrait mode in which the lens assembly can be aimed backwards at the user of the camera but the flash cannot be aimed backwards due to constraints of the camera body or if the flash cannot cover the complete angular range of the lens, a mechanism is utilized to couple the movement of the lens and the flash over a limited range of movement of the lens. Springs, concentric gears attached by springs, or a clutch mechanism may be utilized to selectively couple the flash with the lens rotation. By separating the flash from the lens, the red-eye phenomena will be reduced.

68 Claims, 13 Drawing Sheets

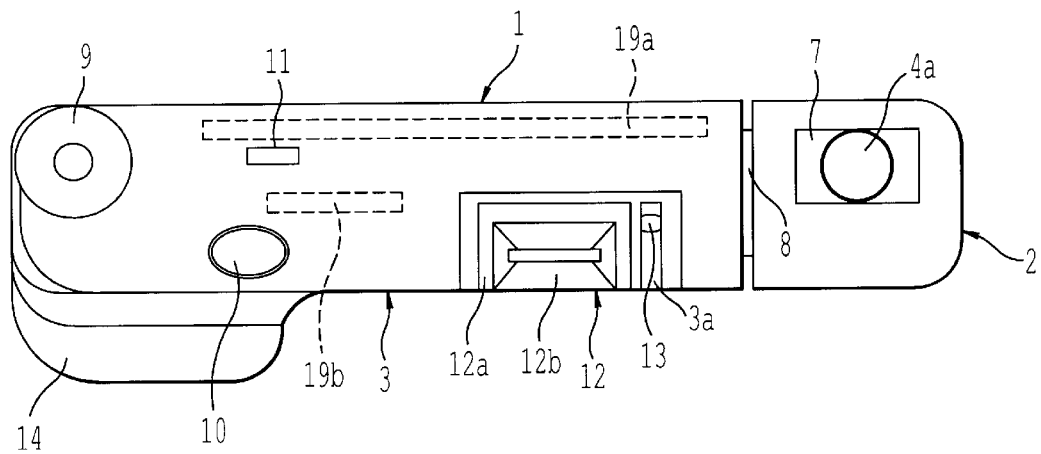
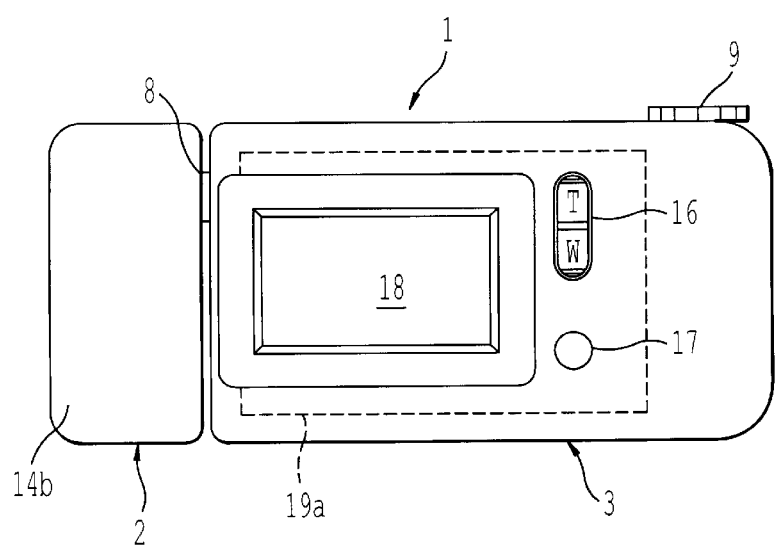

DIGITAL CAMERA HAVING SYNCHRONIZED MOVEMENT OF LENS AND FLASH

BACKGROUND OF THE INVENTION

1. Field of the Invention

This invention is related to a camera having a movable lens and a movable flash. The invention is more particularly related to a digital camera having a lens which can be aimed upwardly and/or downwardly relative to the body of the camera which has a flash which moves up and down with the movement of the lens.

2. Discussion of the Background

FIG. 1A illustrates a digital camera 200 having a camera body 202 and an imaging unit 204. The camera body 202 includes conventional features such as a shutter button 206, control buttons 208, and the imaging unit 204 includes a flash 212, a lens 214, and a flash sensor 216. Decorative lines 210a and 210b are in alignment on the camera body 204 and the imaging unit 204 in FIG. 1A.

FIG. 1B illustrates that the imaging unit 204 having the flash 212 and lens 214 can move upwardly relative to the camera body 202. Thus, the flash is always pointing towards the object which is being photographed.

A problem with the digital camera 200 illustrated in FIGS. 1A and 1B is that because the flash is located so close to the lens, a red-eye phenomenon may be present in images taken by the digital camera 200, resulting in people having unnatural red eyes in the photographs. Further, the inventors have noted that the arrangement illustrated in FIG. 1A may not allow a zoom lens to be used because such a zoom lens requires more physical space than the depth of the camera. Thus, a problem exists in designing a compact digital camera with a zoom lens which effectively prevents red-eye.

SUMMARY OF THE INVENTION

Accordingly, it is an object of the invention is to provide a digital camera in which the flash illuminates the object which is photographed.

It is another object of the invention to provide a digital camera having a lens which moves up and down relative to the camera body and has a flash which is synchronized with the movement of the lens.

It is a further object of the invention to provide a digital camera having a flash disposed within the camera body and a separate rotating imaging unit having a lens connected to the camera body, wherein rotation of the imaging unit and lens causes rotation of the flash within the camera body.

These and other objects are accomplished by a digital camera having a body, an image sensing section which is rotatably connected to the body, and a flash. The flash is connected to the image sensing section and rotatably disposed within the camera body such that when the image sensing section rotates, the flash also rotates. The range of rotation of the flash may be limited and not completely correspond to the range of motion of the image sensing section. The lens of the camera is preferably a zoom lens. As the zoom lens has a depth which may be longer than the depth of the camera, the zoom lens may rotate to point upwardly (or downwardly) so that when stored, the lens is less likely to become damaged.

In a first embodiment, the axis of rotation of the flash is the same as the axis of rotation of the image sensing section. However, other embodiments permit the image sensing section to have a different axis of rotation than the flash. In order to connect the axis of rotation of the image sensing section with the axis rotation of the flash, various mechanisms such as one or more gears or belt are used to rotatably connect the image sensing section with the flash.

In a preferred embodiment of the invention, a gear mechanism is used which has a two gears sharing an axis of rotation. The gears are connected to each other by a spring such that when a limit of the range of movement of the flash is reached, the spring allows relative movement between the two gears so that the image sensing section may continue to rotate, even when the flash can no longer rotate.

BRIEF DESCRIPTION OF THE DRAWINGS

A more complete appreciation of the invention and many of the attendant advantages thereof will be readily obtained as the same becomes better understood by reference to the following detailed description when considered in conjunction with the accompanying drawings, wherein:

FIG. 2C illustrates a top view of the camera illustrated in FIG. 2A;

FIG. 2D illustrates a view from the rear of the camera illustrated in FIG. 2A;

DESCRIPTION OF THE PREFERRED EMBODIMENTS

Figure 1A:
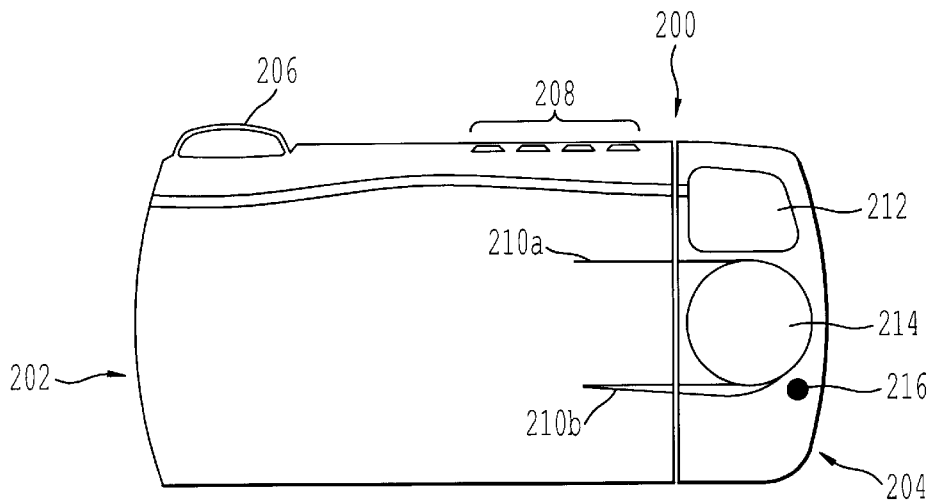
FIG. 1A illustrates a perspective view of a digital camera according to the present invention.
Figure 1B:
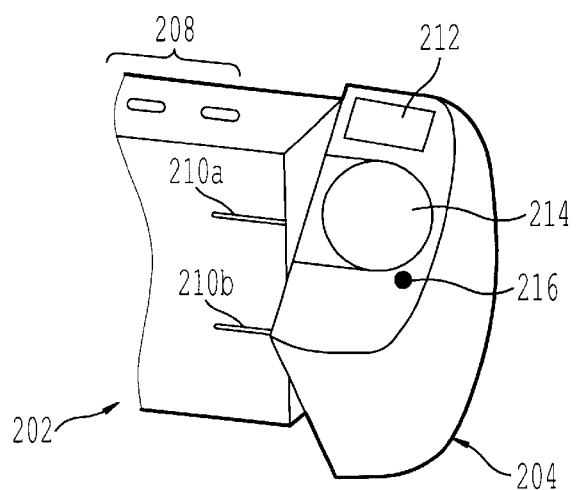
FIG. 1B illustrates a front view of the digital camera illustrated in FIG. 1B with the image sensing section aimed upwardly.
Figure 2A:
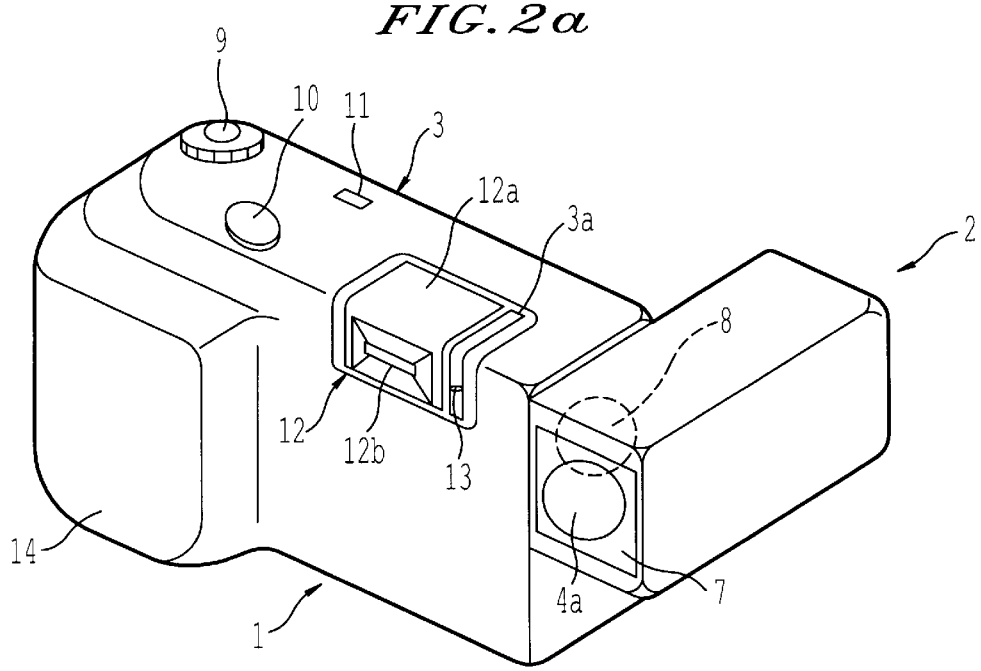
FIG. 2A is a perspective view of a digital camera embodying the principals of the invention.

Referring now to the drawings, wherein like reference numerals designate identical or corresponding parts throughout the several views, and more particularly to FIG. 2A thereof, there is illustrates a perspective view of a digital camera 1 constructed in accordance with the present invention. The digital camera 1 includes an imaging unit 2 which is an image sensing section which is rotatably connected to a camera body 3. The imaging unit 2 includes a first lens 4a which is a portion of a lens assembly 4 (shown in FIG. 2B) which captures images through an image opening 7.

The camera body 3 includes a mode dial 9 for selecting between a recording mode and a reproduction mode. Depressing a shutter button 10 causes an image to be captured by the digital camera 1. There is a flash switch 11 which is utilized to turn the flash on and off, although the flash may also be automatically turned on or off, depending on the position of the imaging unit 2 relative to the digital camera 1.

The camera body 3 includes a flash unit 12 which has a flash window 12a and a light emitting unit 12b which includes a xenon discharge lamp, for example, surrounded by a reflector which properly directs the light from the xenon discharge lamp. In FIG. 2A, the light emitting unit 12b is illustrated as facing forward but as will be explained below, the light emitting unit 12b is rotatable due to rotation of the imaging unit 2 and therefore, the flash unit 12b may be rotated to face upwardly. While rotation of the light emitting unit 12b and its reflector is described, it is possible to implement the invention by the rotation of the reflector behind the xenon discharge lamp of the light emitting unit 12b while allowing the xenon discharge lamp to remain stationary. It is also possible to use any other desired light source as the light emitting unit, as desired.

In order to obtain a proper exposure when utilizing the flash unit 12, there is a light sensor 13 which is a flash sensor which senses an amount of light. Light sensor 13 preferably senses the light reflected off of a subject when the flash is used. In order to properly use the light sensor 13 with the flash unit 12, the light sensor 13 rotates the same amount and faces the direction that the light emitting unit is facing. There is a light sensor window 3a through which the light sensor 13 senses light. The flash unit 12 along with its reflector is preferably constructed so that the field of illumination by the flash unit corresponds to the image sensed by the camera when the lens assembly 4 is capturing the widest angle image possible. The camera body 3 also includes a grip portion 14. There is a connecting shaft 8 which is used to connect the imaging unit 2 with the flash unit 12 inside of the camera body 3.

Figure 2B:
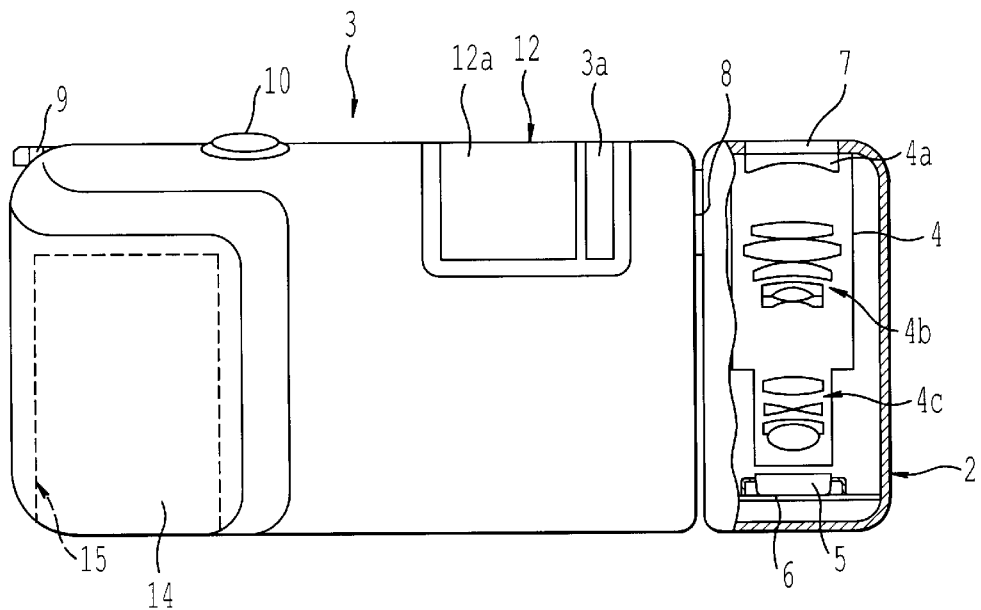
FIG. 2B is a front view of the camera illustrated in FIG. 2A.

FIG. 2B is a front view of the digital camera 1 illustrated in FIG. 2A which shows internal components of the imaging unit 2. In FIG. 2B, the imaging unit is facing upwardly which allows easy storage and transportation of the camera with a reduced chance of breaking the camera as compared with the position of the imaging unit 2 in FIG. 2A. FIG. 2B clearly illustrates the lens assembly 4 having the first lens 4a, a second lens group 4b, and a third lens group 4c. The lens assembly 4 is preferably a zoom lens assembly which is focused controlled based on range information provided by a through-the-lens (TTL) autofocus (AF) optical system for range finding which is, for example, a known system. A motor may be utilized to control the movement of the lenses within the lens assembly 4 in order to change the focal length.

Light passing through the lens assembly 4 is sensed by an image sensing device 5 which may be implemented as a charge coupled device (CCD), which converts light focused thereon into an electrical signal representing the image, although any other type of image sensing device may be used. The imaging unit 2 further includes an imaging unit circuit board 6 connected to the image sensing device 5 which includes, a driving circuit for driving the image sensing device 5, resistors, capacitors, ICs, coils or inductors, and/or other electronic components constituting a converter circuit for performing a light to electrical signal conversion. The imaging circuit board may also include, if desired, circuitry to control the motor which zooms the lens assembly 4, although this circuitry may be located in the camera body 3, if desired.

Of course, signals must be communicated between the camera body 3 and the imaging unit 2. One manner of implementing such communication is through a ribbon cable connected to the imaging unit circuit board 6 which is routed through the shaft 8 and is electrically connected to circuitry such as first and/or second camera body circuit boards 19a and 19b, for example, illustrated in FIG. 2C. Alternatively, any other type of electrical connections may be utilized to electrically connect the imaging unit 2 to the camera body 3 including any form of wires, cables, optical connection devices, electrical connection devices, or using any desired communication means to communicate the necessary information. Also illustrated in FIG. 2B is a battery holder 15 which holds a battery of the digital camera 1.

FIG. 2C illustrates a top view of the camera illustrated in FIGS. 2A and 2B. FIG. 2C contains the first camera body circuit board 19a and the second camera circuit board 19b which are utilized to control the general operation of the digital camera 1, store images captured by the digital camera 1 and/or store programs which control the digital camera 1. The drawings appearing in this application are drawn to scale. Thus, as can be seen in FIGS. 2A and 2C, the camera body 3 has the shape of a thin parallelopiped box having a thin depth dimension and the imaging unit 2 is a vertically elongated box having a side-end shape substantially the same as the side-end shape of the camera body 3. Thus, it is seen from the figures that the depth of the camera 1 is relatively thin when in a storage position but the camera allows the use of a longer zoom lens during operation. However, the structure illustrated in FIGS. 2A–2C makes it difficult to mount a flash unit on the imaging unit 2 on the side thereof containing the first lens 4a and the imaging opening 7. Thus, the flash unit 12 is located on the camera body 3. The concept of the present invention are also applicable to cameras having other shapes including cameras having a relatively short height as compared to the depth of the camera, such as the Ricoh DC-1 digital camera. Further, the principals of the invention may be applied to any type of camera having any desired body style.

FIG. 2D illustrates a rear view of the digital camera 1 illustrated in FIGS. 2A–2C. FIG. 2D further illustrates a grip portion 14b of the imaging unit 2. An image display, which may be implemented as a color liquid crystal display is mounted on the rear surface of the camera body 3. Additionally, there is a zoom button 16 which changes the focal length of the lens from a telephoto to a wide angle mode. There is a power switch 17 which is utilized to turn the camera on and off. The image display 18 presents an image focused by the lens assembly 4 based on a signal from the imaging unit circuit board 6, and also presents an image reproduced from a recording medium such as a memory or IC card. Additionally, the image display 18 may display a variety of operation message screens or information. The image display 18 is connected to the camera body circuit boards 19a and/or 19b and is powered by a battery in the battery holder 15.

Figure 3:
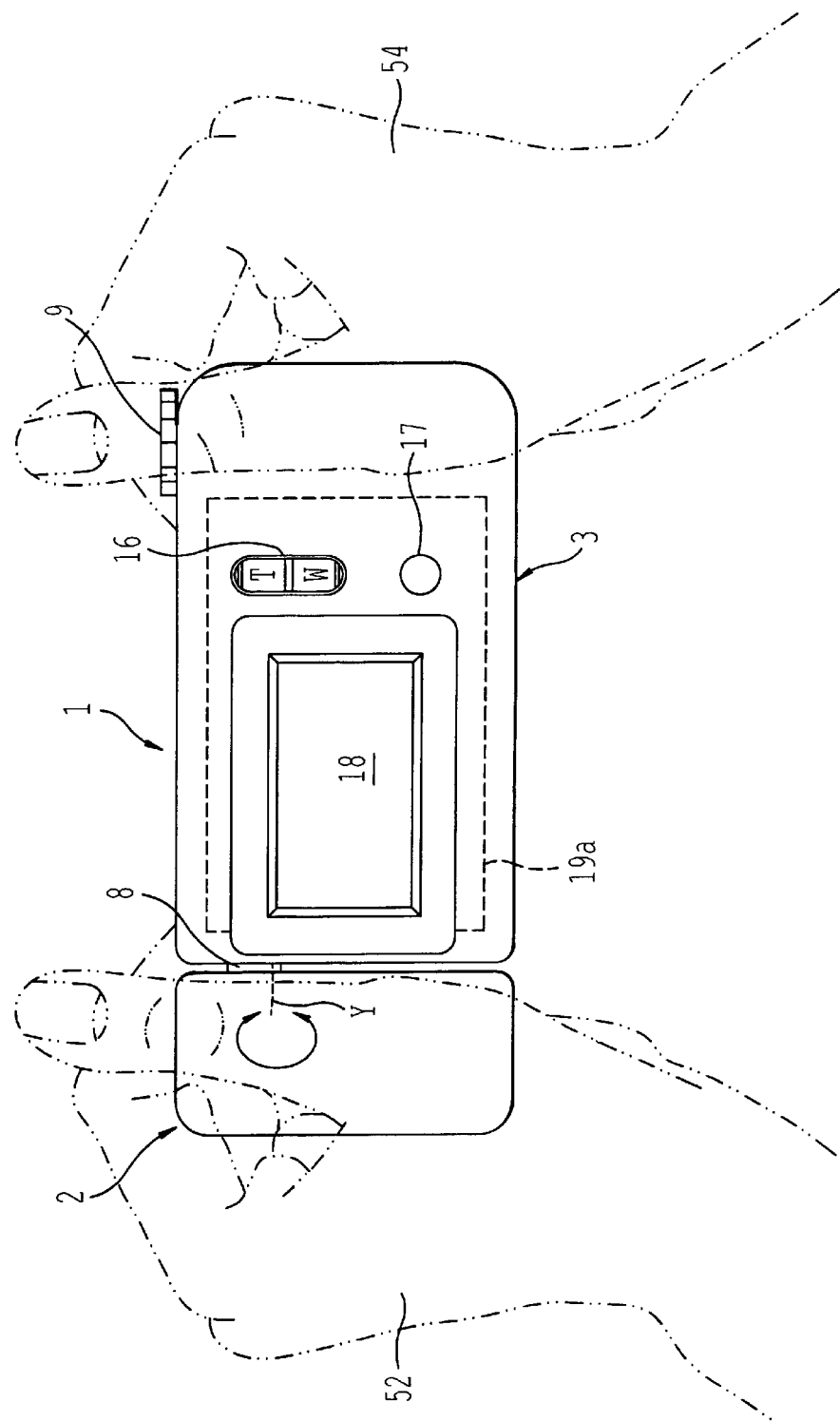
FIG. 3 illustrates a rear view of the camera of FIG. 2A and how a person using the camera holds the camera when taking pictures.

FIG. 3 illustrates how a person holds the digital camera 1 when taking pictures. A right hand 54 grips the grip portion 14 of the camera body 3 at an angle which allows an image on the image display 18 to be clearly visible to the user. The person who is a photographer pivots the imaging unit 2 with a left hand 52 so that the lens assembly 4 points towards the intended object to be photographed. The thumb of the right hand 54 can easily press the power switch 17 and the zoom button 16. The imaging unit 2 is rotated along an axis Y as illustrated in FIG. 3. Additionally, the flash unit 12 rotates in synchronism with the rotation of the imaging unit 2, at least over a predefined or predetermined range of motion.

Figure 4:
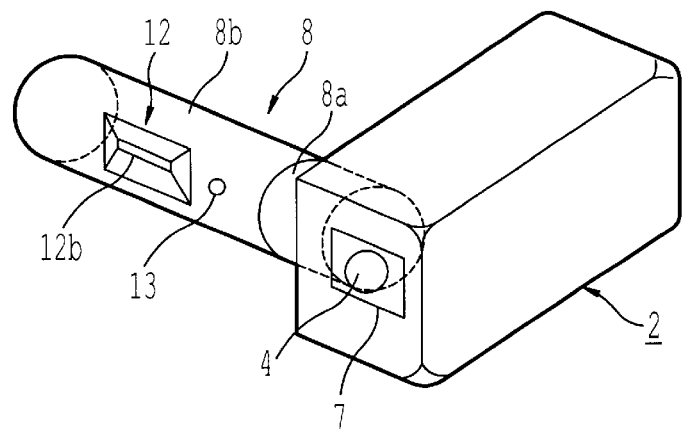
FIG. 4 illustrates a rotatable shaft including the flash and the connection of the rotatable shaft to the imaging unit.

FIG. 4 illustrates a shaft 8 to which the flash unit 12 which includes the light emitting unit 12b is mounted. At one end of the shaft 8 is a first connecting shaft 8a which is cylindrical in shape and is fixed with respect to the imaging unit 2. The first connecting shaft 8a may be directly connected to the imaging unit 2 or alternatively, is connected to the imaging unit 2 through an intermediate element. In this embodiment, the shaft 8 is mounted at a top-front portion of the camera body 3, although other embodiments permit the shaft 8 to be mounted at other positions. The light sensor 13 and the flash unit 12 are both mounted to the first connecting shaft 8a and therefore, the position of the light sensor 13 faces in the same direction as the flash unit 12.

Figure 5:
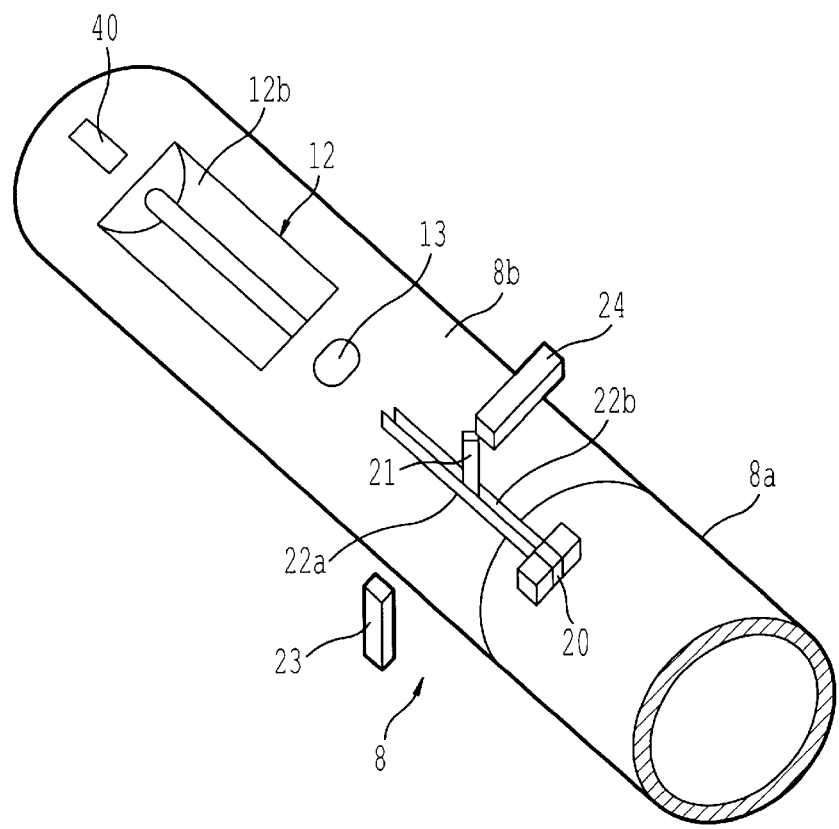
FIG. 5 illustrates the details of the shaft 8 and the structure used to control the rotation of the first connecting shaft 8a which is connected to the imaging unit relative to the rotation second connecting shaft 8b.

Referring to the more detailed enlargement of the shaft 8 illustrated in FIG. 5, it is possible for the first and second connecting shafts 8a and 8b to rotate relative to one another. However, over a range of rotation, it is preferably that the first and second shafts 8a and 8b rotate as a unit. Thus, in FIG. 5, a left portion of the first shaft 8a internally contains a small diameter step portion which engages with a locking step portion at the right side of the second shaft 8b. Such a construction allows the first and second shafts 8a and 8b to rotate together in a collinear fashion but also allows them to disengage from each other. Other mechanisms may be used to assist in the collinear rotation such as a detent mechanism which engages with a protrusion, a spring or a plurality of springs, or any other desired mechanism.

An additional manner of causing the first and second shafts 8a and 8b to rotate together is through the use of a first plate or leaf spring 22a and a second plate or leaf spring 22b which are mounted to a spring holder 20 which is fixed to the first shaft 8a. The first and second plate springs 22a and 22b are spaced apart at a predetermined distance in a cantilever fashion. Between the first and second plate springs 22a and 22b is a pin 21 which is rigidly attached to the second shaft 8b. When the imaging unit 2 is pivoted, the first shaft 8a is rotated which causes rotation of the first and second plate springs 22a and 22b, one of which pushes the pin 21 in order to cause rotation of the second shaft 8b. The second shaft 8b rotates with the first shaft 8a until the pin 21 contacts a first or second stopper 23 or 24 which are fixed with respect to the camera body 3. The first and second stoppers 23 and 24 are preferably spaced apart from the second shaft 8b so that the plate springs 22a and 22b do not contact the stoppers 23 and 24 but only the pin 21 contacts the stoppers 23 and 24. Alternatively, the stoppers 23 and 24 may contact the plate springs 22a and 22b.

In FIG. 5, the stoppers 23 and 24 are arranged such that the flash unit 12 can cover at least 90 degrees; that is, the flash can face horizontally with respect to the camera body 3 and be tilted back to a position where it is directly upward from the camera body 3. It is also possible for the flash unit 12 to move through a greater or lesser range than 90 degrees. For example, it is possible for the flash to be aimed downward, it is also possible to construct the camera so that the flash can be tilted directly backwards in order to have a self-portrait image capturing mode which utilizes the flash.

A feature of the invention is having the camera automatically turn on due to a rotation of the imaging unit 2 from a position where the imaging unit 2 is aimed upwardly with respect to the camera body 3 and thus aligned with the camera body 3. One manner of implementing such a switch which turns on the camera due to movement of the imaging unit 2 is to place an electrical contact 40 on the second shaft 8b (or 8a), as illustrated in FIG. 5. Movement of the second shaft 8b causes the electrical contact 40 either to move out of contact with a corresponding contact on the camera body 3, or to move into contact with a corresponding contact on the camera body 3. Alternative switches may be implemented such as mechanical, optical, or other types of electrical switches. Since the digital camera 1 is switched to the on state by pivoting the imaging unit 2, the photographer can quickly record an image simply by arranging the camera to an in-use position, thus reducing the possibility of a missed photographic opportunity. In addition to turning on the camera by pivoting the imaging unit 2, the camera may additionally be turned on by pressing the power switch 17. If the camera has a self-portrait mode, returning the camera to the position in which the imaging unit 2 is aimed upwardly preferably does not turn off the camera because the imaging unit 2 must pass through a position where it is aimed upwardly in order to go from the conventional mode of taking pictures when the lens assembly 4 is facing forward to the self-portrait position. However, if there is no self-portrait mode, the camera may be turned off by returning the imaging unit 2 to face upwardly. Further, the electrical contact 40 or a different electrical contact or switch may be utilized to sense that the camera is in a self-portrait mode in order to flip the captured and displayed image upside-down so that the actual image captured in the self-portrait mode will be right-side up. Additionally, the camera 1 includes a timer which turns the camera 1 off after a period of inactivity.

Figure 6:
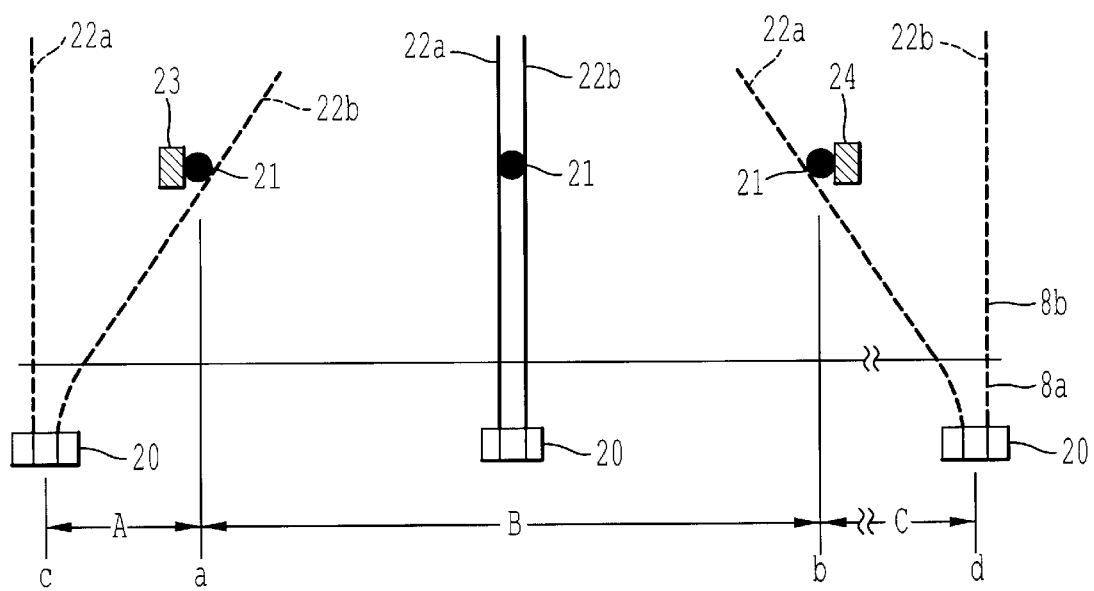
FIG. 6 illustrates the relative movement between the first and second connecting shafts and the interaction of the plate or leaf springs with the driving pin 21 and the first and second stoppers 23 and 24.

FIG. 6 illustrates the angular ranges of movement of the first and second shafts 8a and 8b. Between positions a and b (in the range B), the first shaft 8a moves the same amount as the second shaft 8b moves as the pin 21 moves in an unrestricted manner due to the force from the springs 22a and 22b (and also due to the internal step portion, detent mechanism, or other mechanism used to keep 8a and 8b together). The flash at position a is facing approximately horizontal and the flash at position b is facing approximately vertical. On the left side of FIG. 6, the pin 21 hits the first stopper 23 at position a which prevents the first shaft 8a from further movement downward while the imaging unit 204 continues to move downward. The position where the imaging unit 2 moves downward is between positions c and a (in the range A) of FIG. 6. Alternatively, on the right side of FIG. 6 in the range C between the points b and d, the pin 21 contacts the second stopper 24 which prevents rotation of the second shaft 8b from further backward rotation. In FIG. 6, the range D is approximately 90 degrees, the range A is approximately 30 degrees, and the range C is approximately 120 degrees making the total amount which the imaging unit 2 can be moved equal to 240 degrees with the range of movement of the second shaft 8b and flash unit 12 being approximately 90 degrees. As an alternative to the previously recited angular ranges, other exemplary angular ranges include range A equal to 45 degrees, range B equal to 90 degrees, and range C equal to 150 degrees. The range of the flash may be any desired range and may face backwards at least 10 or 20 degrees from a vertical position. Additionally, it may be preferable to have the flash stop backward movement after it reaches a vertical direction at which time the imaging unit 2 also faces in a vertical direction. However, the stated ranges are merely exemplary and for this particular embodiment and if desired, the flash unit 12 can have a larger range of motion and be permitted to face downwardly or backwards. If the flash is not permitted to face backwards, for example, in the self-portrait mode, a switch such as a switch using the electrical contact 40 may be utilized to automatically turn off the flash unit 12 when in a self-portrait mode as the flash does not have the range to go into a self-portrait mode. However, if the flash has a larger range of motion, the flash can be used in the self-portrait mode.

Figure 7A:
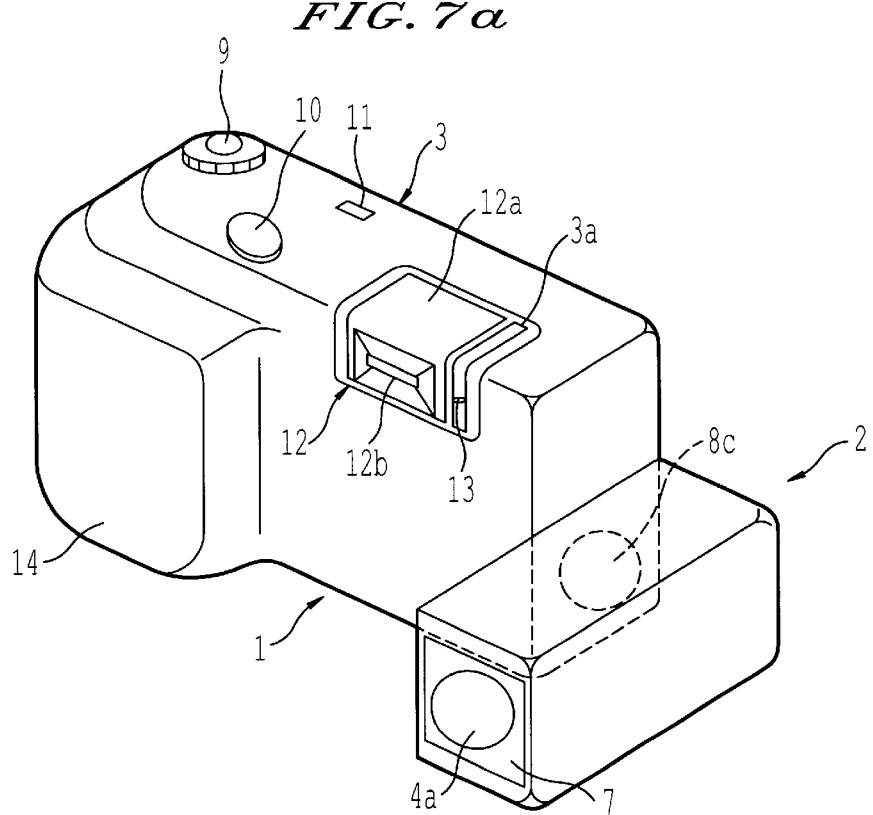
FIG. 7A is a perspective view of a digital camera according to the invention in which the axis of rotation of the imaging unit is different from the axis of rotation of the flash.

FIG. 7A illustrates another embodiment of the invention in which the shaft which connects the imaging unit 2 to the camera body 3 is not disposed at the top or upper portion of the camera body 3 but is disposed at the lower portion of the camera 3. Alternatively, the shaft 8 may also be disposed in the middle portion of the camera body 3. By having the shaft 8 at the lower portion of the camera body 3, the axis of rotation of the imaging unit 2 is at an end portion of the imaging unit 2. Alternatively, if the shaft 8 is at a middle portion of the camera body 3, the axis of rotation of the imaging unit 2 is at a middle portion of the imaging unit 2.

The mechanism within the camera body 3 which moves the flash unit 12 is preferably arranged not to take a large amount of space within the camera body 3 or to divide the camera body 3 into different regions. If a zoom lens were placed in the middle of the camera body 3, the camera body 3 would be divided into different regions or spaces, thus making it difficult to design the circuitry on one circuit board. If desired, a large circuit board can be used within the camera of the present invention such as the circuit board 19a illustrated in FIGS. 2C and 2D. Of course, the present invention allows for the use of more than one circuit board such as the additional circuit board 19b illustrated in FIG. 2C. Thus, the present invention provides enhanced space utilization in the camera body 3 as the mechanism which moves the flash unit 12 is preferably arranged in a space efficient manner.

Figure 7B:
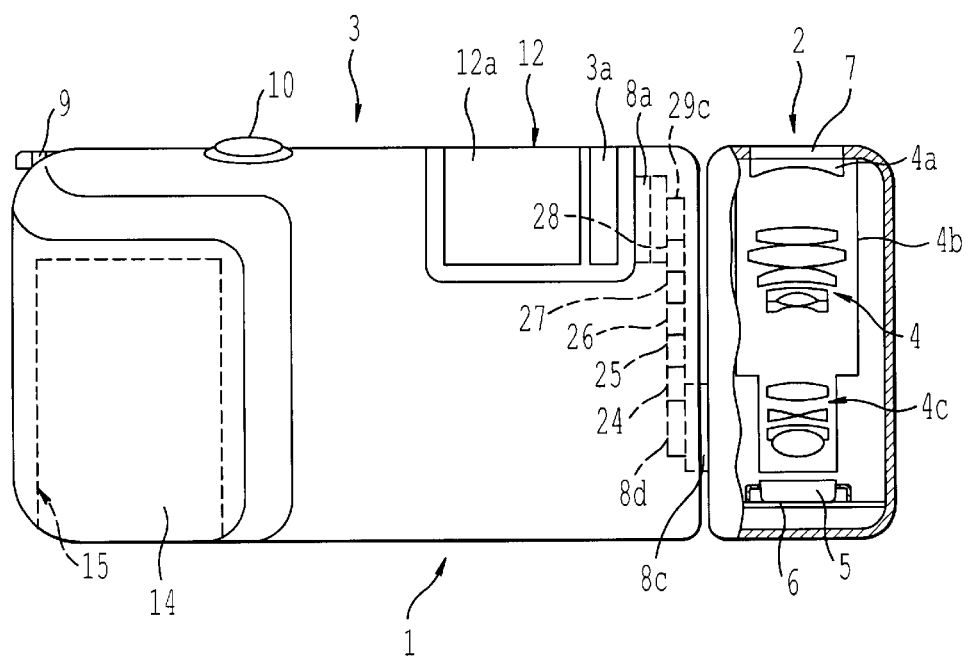
FIG. 7B illustrates a front view of an embodiment of the camera in which a plurality of gears connect the imaging unit 2 with the flash unit 12.

By lowering the position of the shaft 8, as illustrated in FIG. 7B, it may be possible to more easily change the camera angle without taking an unnatural hand position which causes hand twisting and shaking of the camera body 3 due to rising up and down or lateral motion of the hand during camera pivoting. A lower position of the shaft 8 permits a more natural hand position to be achieved which results in more comfort to the user and a more stable holding of the camera which results in better pictures.

FIG. 7B is a front view of the digital camera 1 showing in phantom outline a series of gears connecting the imaging unit 204 to the flash unit 12 within the camera body 3. A shaft 8c connects the imaging unit 2 to the camera body 3 and is connected to a gear 8d. The gear 8d meshes with gear 24 which meshes with gear 25 which meshes with gear 26 which meshes with gear 27 which meshes with gear 28 which meshes with gear 29c. Gear 29c is connected to the first connecting shaft 8a of the shaft 8. Each of the gears 8c, 24–28 and 29c is rotatably supported by a corresponding shaft. The gear 8c and the gear 29c have the same number of gear teeth and the gears 24–28 also have the same number of gear teeth. Alternatively, the intermediate gears 24–28 may have different numbers of teeth and if desired, the gears 29c and 8c have different numbers of teeth. In order for the light emitting unit 12b to rotate in a same direction as the imaging unit 2, the number of gears (or axes of rotations of the gears) which are used by the system is preferably odd, although an even number of gears (or axes of rotations of the gears) could be used with an appropriate design.

Figure 8:
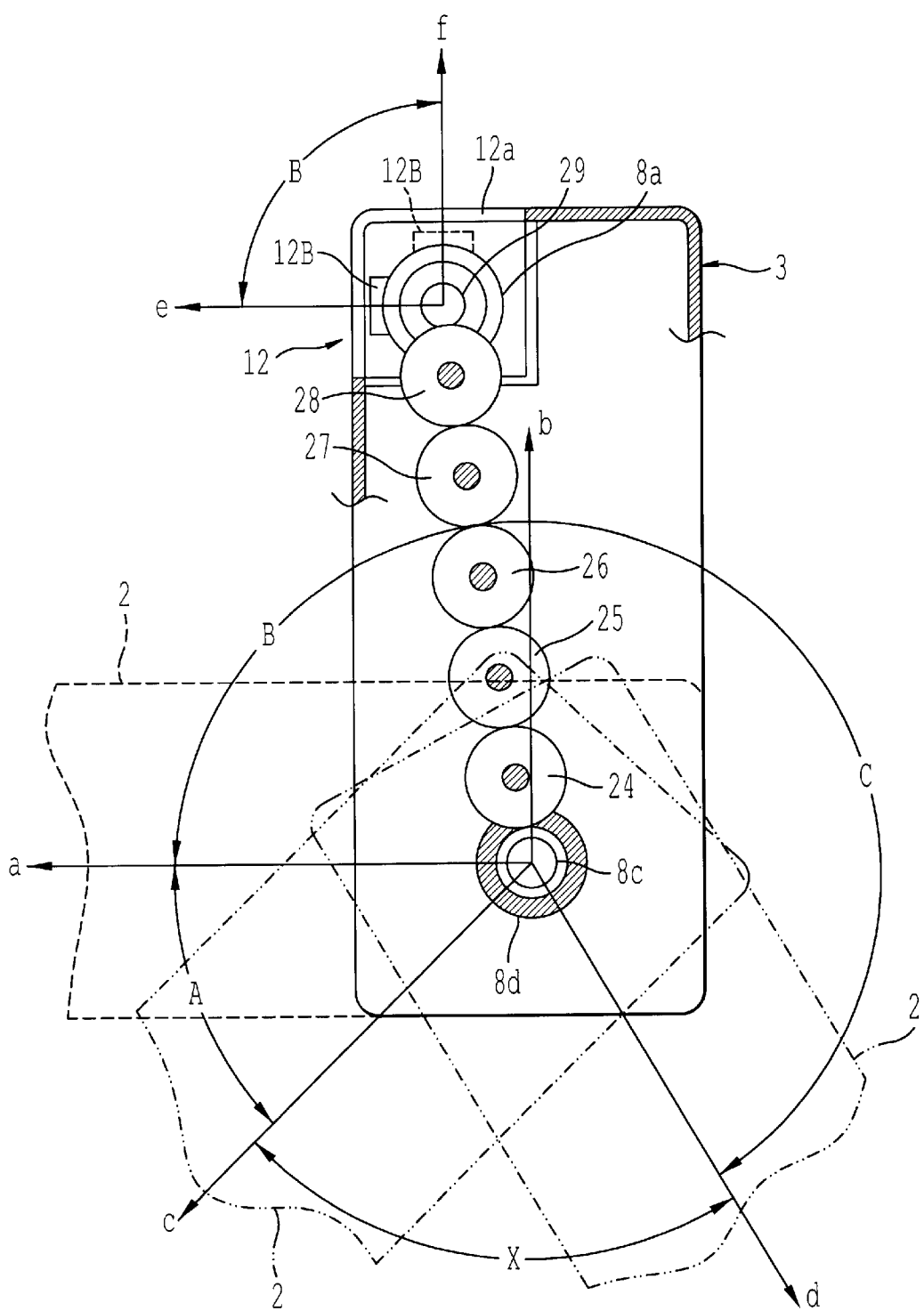
FIG. 8 is a cross-sectional view of the gears used to connect the imaging unit 2 and the flash unit 12 and the range of rotation of the flash relative to the range of rotation of the imaging unit 2.

The drive range of the rotating components of the digital camera 1 is illustrated in FIG. 8. The camera body 3 is illustrated in a cross-section form using a solid outline and the imaging unit 2 is illustrated in phantom form using a broken line. As the camera of FIG. 8 uses a mechanism as illustrated in FIG. 5, over the range B, the lens assembly 4 is aimed in the same direction as the light emitting unit 12b. Thus, when the lens assembly 4 is aimed in the direction of the vector a, the light emitting unit 12b is aimed in the direction of the vector e. When the imaging unit 2 is rotated so that the lens assembly 4 moves through the range B from the direction a to the direction b which is facing upwardly, the light emitting unit 12b also moves through the range B until the light emitting unit 12b faces upwardly in the direction f. As the camera utilized in FIG. 8 has a mechanism such as the mechanism illustrated in FIG. 5, when the pin 21 hits the stopper 23 and the flash unit 12b cannot rotate downwardly passed the direction e, the light emitting unit remains in the direction of e while the lens assembly 4 within the imaging unit 2 rotates through the range A from the direction a through c. Similarly, when the imaging unit 2 is rotated backwards, once the pin 21 hits the stopper 24, the light emitting 12b remains facing upwardly in the direction f while the imaging unit 2 is permitted to rotate from the direction b to the direction d through the range C. In FIG. 8, the range X between c and d is a range which the imaging unit 2 cannot face. The ranges illustrated in FIG. 8 correspond to the ranges A, B, and C of FIG. 6. It is to be noted that the ranges A, B, C, and X are merely exemplary and any desired ranges can be used. For example, the light emitting unit 12b may be aimed downwardly, and also backwards, if desired. Further, the range X can be made narrower or eliminated, if desired.

Figure 9:
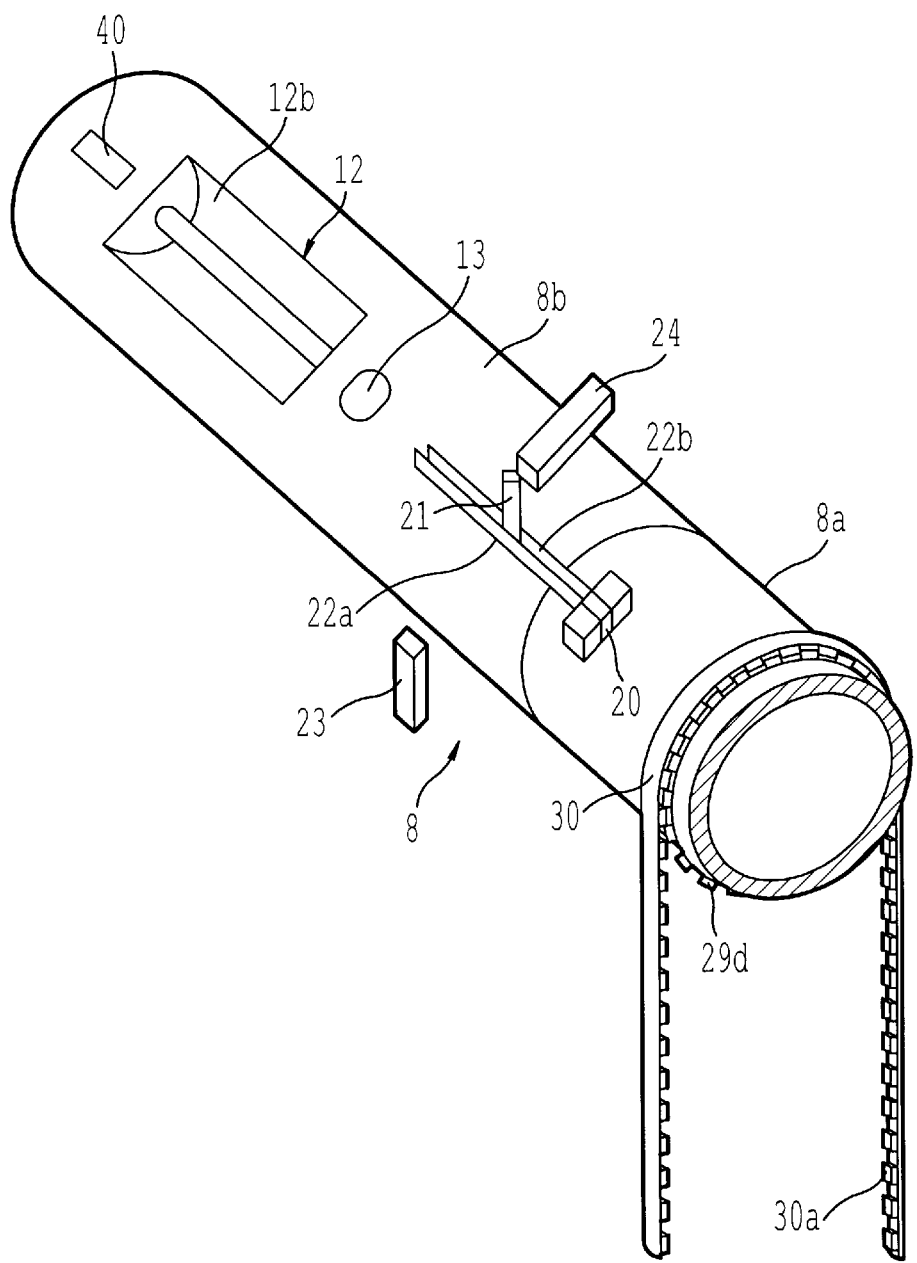
FIG. 9 illustrates a belt which rotatably connects the rotating flash unit with the imaging unit 204.

FIG. 9 illustrates an alternative manner of transmitting the rotating movement from the shaft 8c connecting the imaging unit 2 to the camera body 3 to the first connecting shaft 8a. A timing belt 30 has a cogged face 30a. These cogs mesh with the grooves of the gear 29d connected to the first connecting shaft 8a. The bottom portion of the timing belt 30 is wrapped around the gear 8d connected to the shaft 8c which connects the imaging unit 2 to the camera body 3. As an alternative, the timing belt may be used in addition to a plurality of gears. For example, if desired, the timing belt may be wrapped around a gear which is connected to the gear 25 illustrated in FIG. 8. Alternatively, the timing belt may include a half twist and wrap around a gear connected to the gear 24 illustrated in FIG. 8A. Alternatively, any other desired manner of using a timing belt and/or gears to rotatably couple the light emitting unit 12b with the imaging unit 2 may be utilized.

Figure 10:
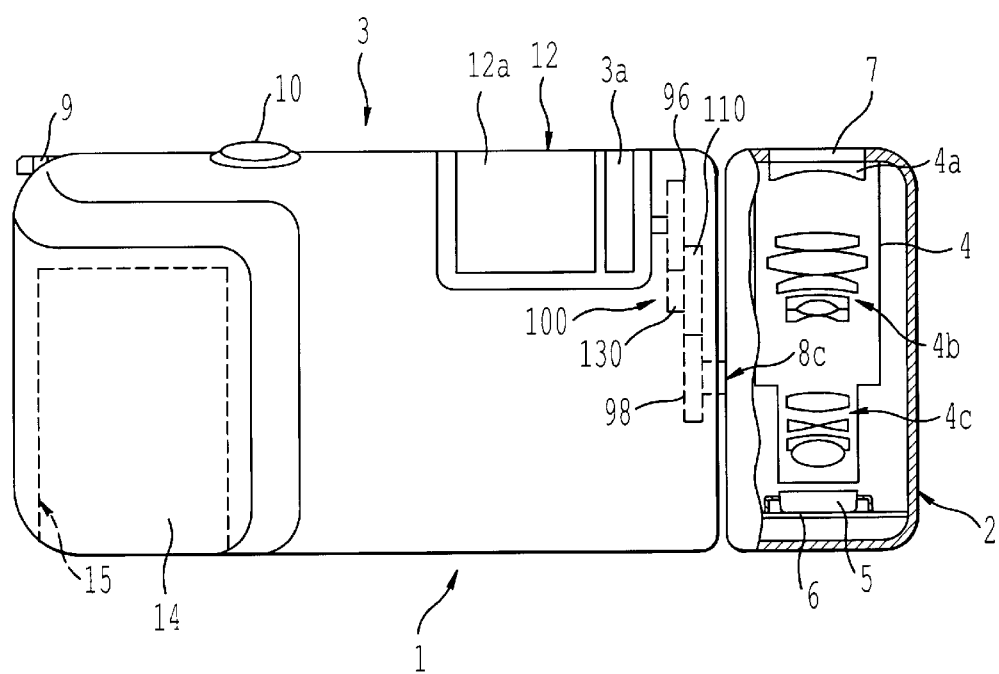
FIG. 10 illustrates another embodiment of the invention in which a gear mechanism which includes two gears which can rotate relative to each other have a common axis of rotation and permit a rotatable coupling of the flash unit and the imaging unit over a limited range of movement.

The previous embodiments of this invention were described, for example, using the springs 22a and 22b along with the pin 21 and stoppers 23 and 24, as illustrated in FIGS. 5 and 9. However, the present invention does not require the use of such springs. For example, the shaft 8 illustrated in FIGS. 5 and 9 may be constructed as one piece or in pieces which do not move with respect to each other and therefore, the light emitting unit 12b and the imaging unit 2 will be directly connected to each other and/or unitary. In FIG. 4, the light emitting unit 12b is not directly connected to the imaging unit 2 because of the first connecting shaft 8a which is connected to the second connecting shaft 8b which holds the light emitting unit 12b. However, the invention can be constructed without using the mechanism illustrated in FIGS. 5 and 9 but may still allow the light emitting unit 12b to rotate with the imaging unit 2 over a limited range of rotation of the imaging unit 2 and to allow the light emitting unit 12b to remain stationary during a predetermined range of motion of the imaging unit 2. In FIG. 10, a gear 98 which is connected to the imaging unit 2 through the shaft 8c meshes with a gear mechanism 100. The gear mechanism 100 also meshes with a gear 96 which is connected to the light emitting unit 12b. When the gear 96 rotates, the light emitting unit 12b preferably rotates in the same amount. The gear mechanism 100 allows the light emitting unit 12b to remain stationary over a range of rotation due to relative movement occurring between a larger gear 110 and a smaller gear 130.

Figure 11:
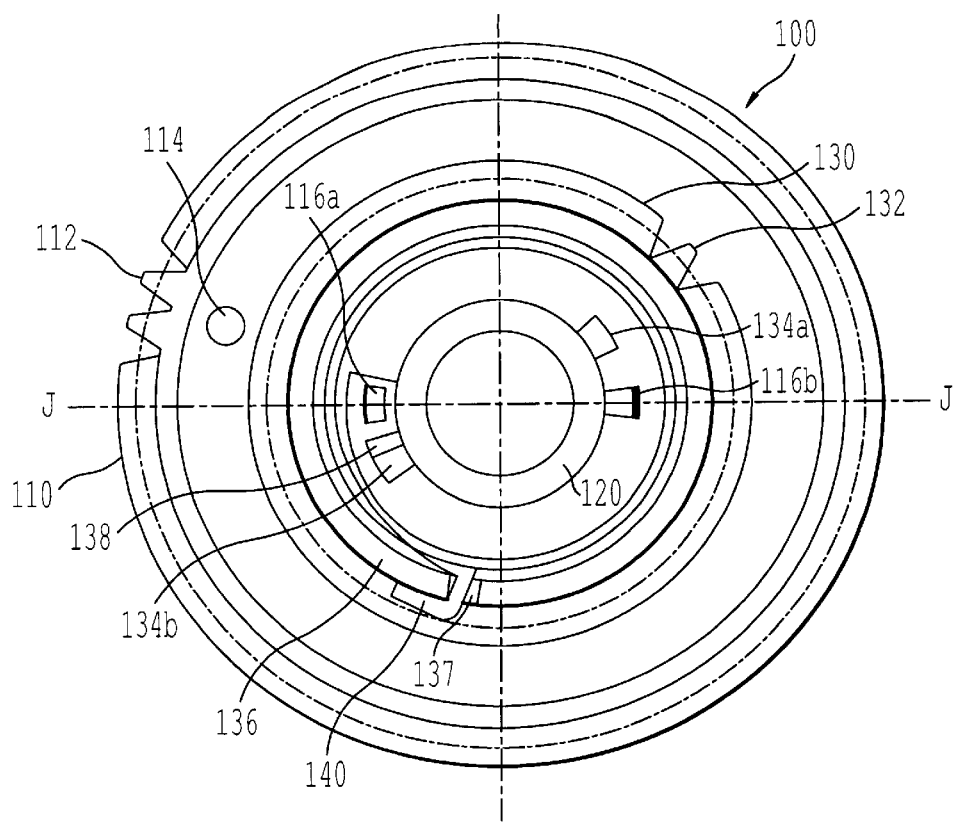
FIG. 11 is a top view of the two gears of the gear mechanism utilized to impart a limited range of rotation.

FIG. 11 illustrates a top view of the gear mechanism 100. The gear mechanism 100 includes the larger gear 110 which is referred to as an outer gear and the smaller gear 30 is referred to as an inner gear. Both gears preferably share the same axis of rotation. The outer gear 110 is connected to the inner gear 130 by a spring 140. The spring 140 connects to the inner gear at an indentation 137 in a ring 136 of the inner gear 130 and the spring 140 connects to the outer gear 110 at a first stop or stopping element 116a. Further features of the gear mechanism 100 are explained below with respect to FIGS. 12–15.

Figure 12:
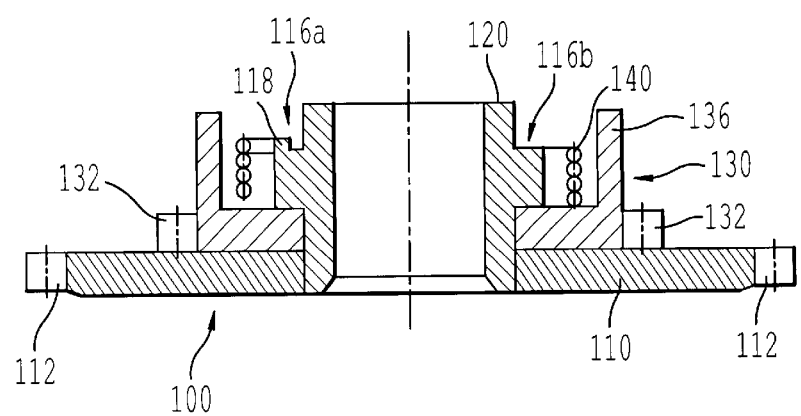
FIG. 12 is a cross-sectional view of the gear mechanism illustrated in FIG. 11.

FIG. 12 is a cross-sectional view of the gear mechanism 100 taken along line JJ illustrated in FIG. 11. The gears 110 and 130 are preferably made of the same material such as resin or plastic, although metal or any desired material may be used. In FIG. 12, the outer gear 110 has cross hatching in an upper left to a lower right direction whereas the inner gear 130 has cross hatching in a lower left to upper right direction. The outer gear 110 includes a hub 120 around which the inner gear 130 rotates. The hub 120 of the outer gear 110 includes a first stop 116a and a second stop 116b which limits the range of motion of the inner gear 130 with respect to the outer gear 110 due to contact with a tab 138 (not illustrated in FIG. 12) of the inner gear 130. The stop 116a includes a separated section 118 which allows the spring 140 to be held between the hub 120 and the first stop 116a. The first and second stops 116a and 116b also prevent the inner gear 130 from separating from the outer gear 110. The outer gear 110 includes gear teeth 112 and the inner gear 130 includes the gear teeth 132. The inner gear 130 also includes a ring 136 which serves as a mounting point for the spring 140, as illustrated in FIG. 11, and also serves to contain the spring 140.

Figure 13:
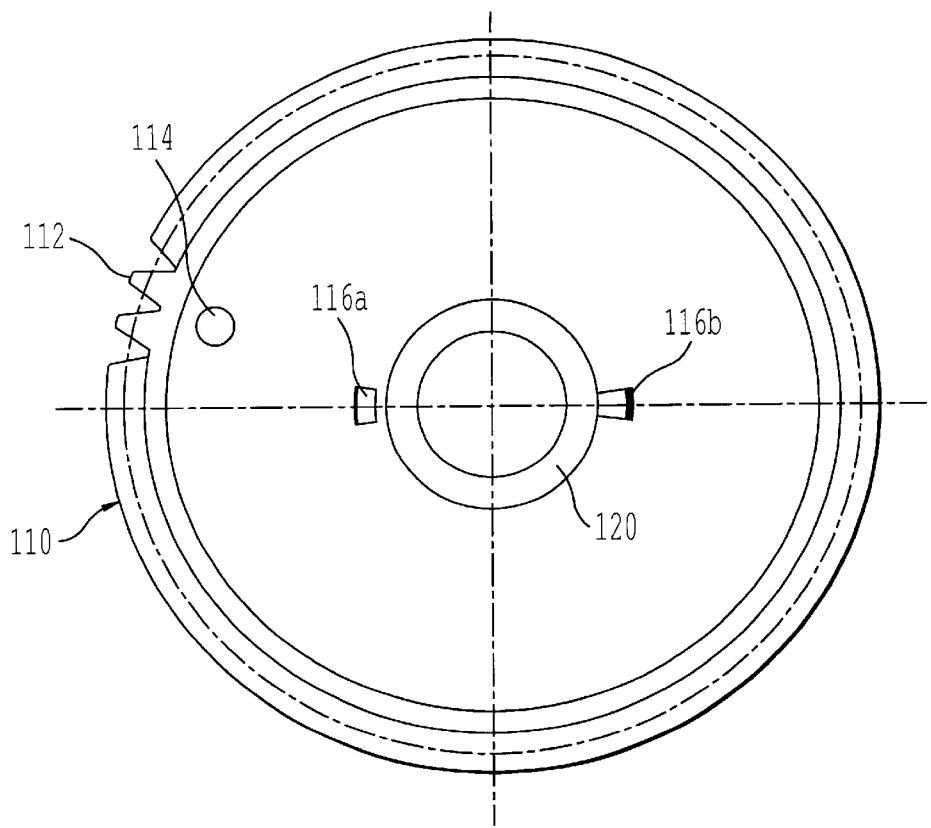
FIG. 13 is a top view of the larger outer gear of the gear mechanism illustrated in FIGS. 11 and 12.

FIG. 13 illustrates the outer gear 110 without the inner gear 130 or spring 140 mounted thereto. As seen in FIG. 13, the outer gear 110 includes the gear teeth 112, a hole 114, the first and second stops 116a and 116b, and the hub 120. The hole 114 is not a necessary element in this embodiment and may be omitted. However, the hole 114 may be utilized for alignment during the process of assembling the gear mechanism and may also be helpful in positioning the gear mechanism 100 during installation into the camera body 3.

Figure 14:
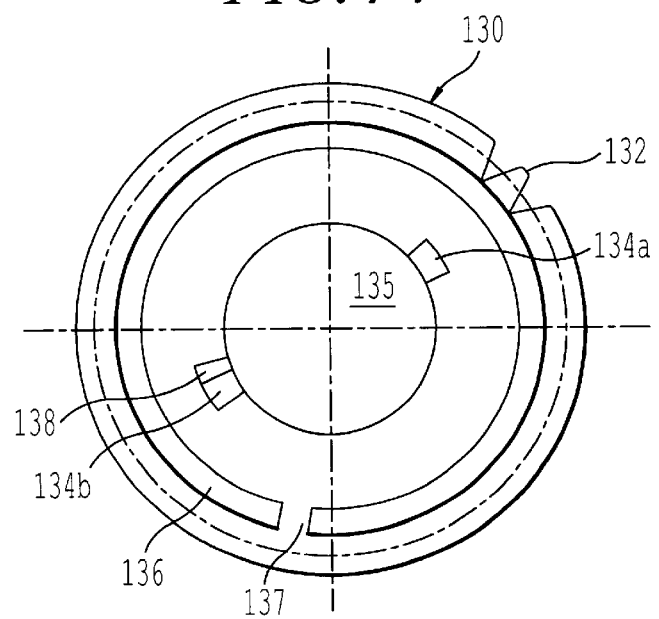
FIG. 14 is a top view of the smaller inner gear of the gear mechanism illustrated in FIGS. 11 and 12.

FIG. 14 illustrates the inner gear 130. The inner gear 130 includes the gear teeth 132, a first hole 134a and a second hole 134b. The first and second holes 134a and 134b receive the first and second stops 116a and 116b during assembly of the gear mechanism 100. Once the stops 116a and 116b are respectively pushed through the holes 134a and 134b and the first and second gears are rotated with respect to each other, the inner gear 130 cannot be separated from the outer gear 110 because the inner gear 130 contacts the stops 116a and 116b as illustrated in FIG. 12. A large circular hole 135 at the center of the inner gear 130 receives the hub 120 of the outer gear 110 and gives the inner and outer gears 130 and 110 the same axis of rotation. As explained above, the ring 136 contains the spring 140 therein and includes an indentation 137 to which the spring 140 is mounted. Additionally, the inner gear 130 includes the tab 138 which limits the range of relative rotation between the inner and outer gears 130 and 110.

Figure 15:
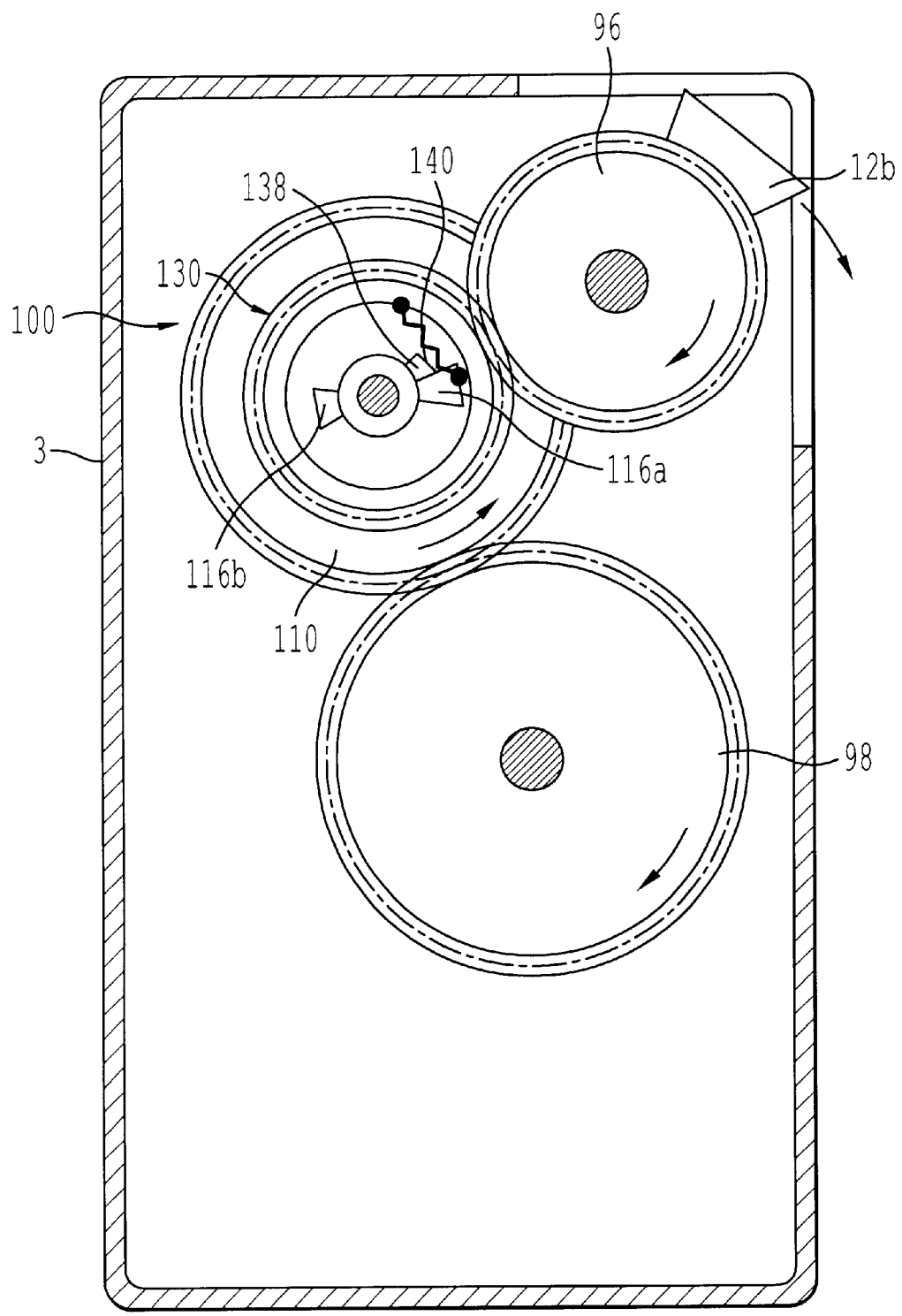
FIG. 15 is a cross-sectional view of the gear mechanism interacting with a gear which drives the flash unit and a gear which is connected to the imaging unit.

FIG. 15 illustrates a cross-sectional view of the camera body 3 including the gear mechanism 100. When the imaging unit 2 is rotated downwardly, the gear 98 rotates in a clockwise direction as illustrated in FIG. 15. The outer gear 110 meshes with the inner gear 98 causing the gear mechanism 100 to rotate in a counter-clockwise direction. Because the first stop 116a of the outer gear 110 contacts the tab 138 of the inner gear 130, the inner gear 130 also rotates in a counter-clockwise direction and thus causes the gear 96 to rotate in a clockwise manner and rotate the light emitting unit 12b downwardly, as illustrated in FIG. 15.

When the imaging unit 2 is rotated backwards or in a counter-clockwise direction and the light emitting unit 12b is facing upward and/or can no longer rotate any further in a counter-clockwise direction due to a stop or limiting device, the outer gear 110 continues to rotate in a clockwise direction but the inner gear 130 is fixed. Thus, the spring 140 extends due to rotation of the stop 116a to which the spring is connected.

The double gear mechanism 100 does not have to be located in the position illustrated in FIG. 10 but may be substituted in place of gears 96 or 98 with a regular gear such as gear 98 being substituted in place for the gear mechanism 100 at the position illustrated in FIG. 10. Further, the general structure of the mechanism 100 including two members such as illustrated in FIGS. 13 and 14 can be used with any of the illustrated embodiments and may be constructed with or without gear teeth. For example, in place of the plate springs 22a and 22b illustrated in FIG. 5 and any other mechanism used with FIG. 5, the mechanism 100 may be used to rotatably connect the first shaft 8a with the second shaft 8b by disposing the mechanism 100 between 8a and 8b or alternatively inside of 8a and/or 8b. The mechanism 100 can also be used with any of the embodiments illustrated in FIGS. 7A–9, or in any other embodiment. With such an arrangement, one of the devices such as illustrated in FIGS. 13 and 14 would be fixed to the first connecting shaft 8a and the other of the devices illustrating FIGS. 13 and 14 is connected to the second shaft 8b. Thus, over a first predetermined range, 8a and 8b would rotate with each other whereas once the light emitting unit 12b reached a point at which it could no longer move, the portion of the mechanism 100 connected to 8a would rotate with 8a whereas the portion of the mechanism 100 connected to 8b would be fixed and not rotate as the light emitting unit 12b would be fixed. The mechanism 100 could also be used with a belt and in the mechanism illustrated in FIG. 9. Further, the different features from the various embodiments of the invention may be combined with each other in order to have still further embodiments and variations.

While this invention is particularly applicable to a thin camera with a shallow depth such as that illustrated in the figures, the invention is also applicable to any shaped digital camera including cameras which are short in height. Variations and modifications of the above described features may be utilized without departing from the scope of the appended claims. For example, although the preferred implementation of the image display 18 is a liquid crystal display, the display may be implemented in any other manner including an array of miniature light emitting diodes. The light emitting diodes would substantially increase the contrast of the display as compared to a liquid crystal display because of the self-emitting feature and because light emitting diodes can be easily constructed without a back-light source.

In place of or in conjunction with the above-described mechanisms which allow relative movement during certain ranges and a fixing of the rotational movements of the first and second shafts 8a and 8b, a clutch mechanism may be utilized to connected the first and second shafts 8a and 8b. Based on the pivot angle of the imaging unit 2, the clutch mechanism may be switched between a coupled state and a decoupled state. Alternatively, the light emitting unit 12b may be driven by a motor such as a stepping motor using a drive unit, based on an electric signal and a sensed position of the imaging unit 2. With this arrangement, there is an electrical connection between the imaging unit 2 and the light emitting unit 12b. Further, an end cam covering the pivotal angular range of the light emitting unit 12b may be used so that the clutch mechanism decouples the first and second shafts 8a and 8b when a pivotal angular range is exceeded.

Although the flash window 12a is arranged on the front of the camera body 3 and is described as covering an angular range of approximately 90°, the flash window 12a may be widened in its area of angular coverage in order to illuminate behind the camera body 3, thus widening the range of the flash coverage to 180° or more. If the range of coverage of the light emitting unit 12b is increased, the present invention may be used with a digital camera having a flash which also operates in a self-portrait mode and additionally, the use of a mechanism which decouples the first and second shafts 8a and 8b may be eliminated so that the light emitting unit 12b always points to a position at which the lens assembly 4 of the imaging unit 2 is aimed.

The width of the beam from the light emitting unit 12b complies with the focal length at the wide-angle end of the lens assembly 4 regardless of the zoom driving by the lens assembly 4. However, the strength of the flash may be increased by detecting the amount of zoom utilized by the lens assembly 4 and controlling the flash beam width from the light emitting unit 12b based on the focal length of the lens assembly 4.

Although the image opening 7 has on its front no barrier that is closed when the camera is not in use, if desired the present invention may be implemented with such a barrier, such as a lens cap or automatic cover, if desired. Although the imaging opening 7 arranged on the front of the lens assembly 4 is designed to look upward in its unused or retracted position, other designs are acceptable including a design in which the imaging opening 7 looks downward in its retracted or unused position. With this arrangement, no foreign matter or dust collects on the surface of the imaging opening 7 or lens assembly 4 when the digital camera 1 is left in a dusty or dirty environment over a period of time. Further, the first lens 4a is protected from fingerprints, smudgings, and markings which result from inadvertent touching.

The design of the present invention allows the use of a zoom lens in a thin camera and reduces the risk of damaging the zoom lens by allowing the zoom lens to be positioned such that the shape of the body of the camera corresponds to the shape of the zoom lens contained within an imaging unit connected to the camera body. Thus, even if the number of lens elements is increased and the zoom lens becomes large in size such as sometimes occurs using a multi-focus lens or a zoom lens, there is no requirement to increase the depth of the digital camera and the lens is not projected in front of or behind the camera body during storage. This allows the digital camera to conveniently be carried and reduces the chances of the lens from hitting something and becoming damaged.

By arranging the light emitting unit 12b on the camera body 3 instead of the imaging unit 2, a red-eye phenomenon which results from the use of a flash is reduced as compared to when the flash is located next to the lens.

When the imaging unit 2 pivots about the camera body 3 at a lower portion of the camera body 3, the fulcrum of the joint or pivot between the camera body 3 and imaging unit 2 comes near the wrist joint of the photographer, which allows a smooth and easy motion of relative movement between the imaging unit 2 and the camera body 3. Thus, the hand holding the imaging unit 2 is free from upward and downward and lateral movement, and the base unit is able to be held steady and free from shaking. Further, by arranging the camera as described, the mechanism which moves the light emitting unit 12b does not divide the space interior to the camera body 3 into two sections which results in a digital camera having an efficient space utilization and allows for easier assembly of the camera.

The above-described embodiments utilize a rotation of the flash to change an aiming direction thereof. However, the direction in which the flash is aimed may be changed in other manners including sliding the light emitting unit 12b in or along a grave or track.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A digital camera, comprising:

a body;

an image sensing section, rotatably connected to the body, including a lens and an image sensor which senses light passing through the lens; and a flash which is connected to the image sensing section and rotatably disposed within the body such that when the image sensing section rotates, the flash rotates within the body.

2. A digital camera according to claim 1, wherein:

the flash is rotatably connected to the image sensing section over a limited range of movement of the image sensing section.

3. A digital camera according to claim 1, further comprising:

a display mounted to the body.

4. A digital camera according to claim 3, wherein:

the display is mounted on a rear portion of the body, and when the image sensing section is arranged to capture an image in front of the body, a length from a front portion of the image sensing section to a rear portion of the image sensing section is larger than a length from a front to the rear portion of the camera body.

5. A digital camera according to claim 4, wherein the image sensing section comprises:

a zoom lens.

6. A digital camera according to claim 4, wherein:

a thickness of the body from the front to rear portion is less than a height of the body.

7. A digital camera according to claim 1, wherein:

the flash is mounted to a rotating mechanism having a first gear, and the image sensing mechanism is mounted to a second gear, the digital camera further comprising:

a gear mechanism connecting the first gear and the second gear.

8. A digital camera according to claim 7, wherein:

the gear mechanism consists of only one axis of rotation.

9. A digital camera according to claim 8, wherein:

the gear mechanism includes two gears mounted on said one axis of rotation, one of said two gears of the gear mechanism engaging with the first gear of the rotating mechanism to which the flash is mounted, and the other of the two gears of the gear mechanism engaging with the image sensing portion.

10. A digital camera according to claim 9, wherein the first gear of the gear mechanism is connected to the second gear of the gear mechanism by a spring.

11. A digital camera according to claim 10, wherein:

during a first range of rotation of the image sensing section, the spring fixes the first and second gears of the gear mechanism to rotate together, and during a second range of rotation of the image sensing section, the spring allows the first gear of the gear mechanism to rotate with respect to the second gear of the gear mechanism.

12. A digital camera according to claim 11, wherein:

the first range includes a forward facing of the image sensing mechanism; and the second range includes a rearward facing of the image sensing mechanism for a self-portrait mode.

13. A digital camera according to claim 12, wherein:

in the self-portrait mode, both the display and the image sensor face towards a same direction.

14. A digital camera according to claim 11, wherein:

the second range includes the flash facing backwards at least 20 degrees from a vertical position.

15. A digital camera according to claim 11, wherein:

the second range includes the flash facing backwards at least 10 degrees from a vertical position.

16. A digital camera according to claim 11, wherein:

the first range ends when the flash is facing approximately in a vertical direction and the image sensing section is also facing in the vertical direction.

17. A digital camera according to claim 7, wherein one of the first and second gears comprises:

two gears mounted on one axis of rotation and connected to each other by a spring, and the gear mechanism consists of a single gear.

18. A digital camera according to claim 11, wherein:

the first range ends at a position where the flash is prevented from further rotation.

19. A digital camera according to claim 18, wherein:

the flash is disabled when the image sensing section is in the second range.

20. A digital camera according to claim 7, wherein the gear mechanism comprises:

a plurality of gears having corresponding axes of rotations.

21. A digital camera according to claim 20, wherein:

the number of axes of rotation is an odd number.

22. A digital camera according to claim 1, further comprising:

a belt rotatably connecting the image sensing section to the flash.

23. A digital camera according to claim 22, wherein:

the belt comprises teeth, and the belt is wound around a first circular contact connected to the flash and a second circular contact connected to the image sensing section, both of the first and second circular contacts having teeth which engage with the teeth of the belt.

24. A digital camera according to claim 1, wherein the flash and image sensing section have a same axis of rotation.

25. A digital camera according to claim 24, wherein:

the flash and image sensing section are directly connected to each other.

26. A digital camera according to claim 23, wherein:

the flash and image sensing section are unitary.

27. A digital camera according to claim 1, further comprising:

a spring connecting the flash to the image sensing section.

28. A digital camera according to claim 1, wherein:

the spring causes the flash to rotate with the image sensing section during a first predetermined range of rotation of the image sensing section and allows the flash to remain stationary when the image sensing section rotates during a second predetermined range.

29. A digital camera according to claim 1, further comprising:

a switch which turns the digital camera on when there is rotation of the image sensing section.

30. A digital camera according to claim 29, further comprising:

a second switch mounted to the body for a user to switch the camera on and off.

31. A digital camera according to claim 30, wherein said switch which turns the camera on has a function of controlling power to the camera only by turning the camera on.

32. A digital camera according to claim 1, wherein:

an axis of rotation of the image sensing section is at an end portion of the image sensing section.

33. A digital camera according to claim 1, wherein:

an axis of rotation of the image sensing section is at a middle portion of the image sensing section.

34. A digital camera, comprising:

a body;

an image sensing means, rotatably connected to the body, including a lens and a light sensing means which senses light passing through the lens; and a flash means for illuminating which is connected to the image sensing means and movably disposed within the body such that when the image sensing means rotates, the flash means moves such that it is directed towards a same direction as the image sensing means is directed at least over a predetermined range of movement of the image sensing means.

35. A digital camera according to claim 34, further comprising:

a coupling means which rotatably couples the flash means and the image sensing means such that the flash means rotates a corresponding amount as the image sensing means rotates at least over the predetermine range of movement.

36. A digital camera according to claim 35, wherein:

the flash means is rotatably connected to the image sensing means using the coupling means over a limited range of movement of the image sensing means.

37. A digital camera according to claim 35, further comprising:

a display means mounted to the body.

38. A digital camera according to claim 37, wherein:

the display means is mounted on a rear portion of the body, and when the image sensing means is arranged to capture an image in front of the body, a length from a front portion of the image sensing means to a rear portion of the image sensing means is larger than a length from a front to the rear portion of the camera body.

39. A digital camera according to claim 38, wherein the image sensing means comprises:

a zoom lens means.

40. A digital camera according to claim 38, wherein:

a thickness of the body from the front to rear portion is less than a height of the body.

41. A digital camera according to claim 36, wherein:

the flash means is mounted to a rotating mechanism having a first gear, the image sensing mechanism is mounted to a second gear, and the coupling means is a gear mechanism means for connecting the first gear and the second gear.

42. A digital camera according to claim 41, wherein:

the gear mechanism means consists of only one axis of rotation.

43. A digital camera according to claim 42, wherein:

the gear mechanism means includes two gears mounted on said one axis of rotation, one of said two gears of the gear mechanism means engaging with the first gear of the rotating mechanism to which the flash means is mounted, and the other of the two gears of the gear mechanism means engaging with the image sensing portion.

44. A digital camera according to claim 43, wherein the first gear of the gear mechanism means is connected to the second gear of the gear mechanism means by a spring means.

45. A digital camera according to claim 44, wherein:

during a first range of rotation of the image sensing means which is said predetermined range, the spring means fixes the first and second gears of the gear mechanism means to rotate together, and during a second range of rotation of the image sensing means, the spring means allows the first gear of the gear mechanism means to rotate with respect to the second gear of the gear mechanism means.

46. A digital camera according to claim 44, wherein:

the first range includes a forward facing of the image sensing mechanism; and the second range includes a rearward facing of the image sensing mechanism for a self-portrait mode.

47. A digital camera according to claim 46, wherein:

in the self-portrait mode, both the display means and the light sensing means face towards a same direction.

48. A digital camera according to claim 45, wherein:

the second range includes the flash means facing backwards at least 20 degrees from a vertical position.

49. A digital camera according to claim 45, wherein:

the second range includes the flash means facing backwards at least 10 degrees from a vertical position.

50. A digital camera according to claim 45, wherein:

the first range ends when the flash means is facing approximately in a vertical direction and the image sensing means is also facing in the vertical direction.

51. A digital camera according to claim 41, wherein one of the first and second gears comprises:

two gears mounted on one axis of rotation and connected to each other by a spring means, and the gear mechanism means consists of a single gear.

52. A digital camera according to claim 44, wherein:

the first range ends at a position where the flash means is prevented from further rotation.

53. A digital camera according to claim 52, wherein:

the flash means is disabled when the image sensing means is in the second range.

54. A digital camera according to claim 41, wherein the gear mechanism means comprises:

a plurality of gears having corresponding axes of rotations.

55. A digital camera according to claim 54, wherein:

the number of axes of rotation is an odd number.

56. A digital camera according to claim 35, further comprising:

a belt means for rotatably connecting the image sensing means to the flash means.

57. A digital camera according to claim 56, wherein:

the belt means comprises teeth, and the belt means is wound around a first circular contact connected to the flash means and a second circular contact connected to the image sensing means, both of the first and second circular contacts having teeth which engage with the teeth of the belt means.

58. A digital camera according to claim 35, wherein the flash means and image sensing means have a same axis of rotation.

59. A digital camera according to claim 58, wherein:

the flash means and image sensing means are directly connected to each other.

60. A digital camera according to claim 57, wherein:

the flash means and image sensing means are unitary.

61. A digital camera according to claim 35, further comprising:

a spring means for connecting the flash means to the image sensing means.

62. A digital camera according to claim 35, wherein:

the spring means causes the flash means to rotate with the image sensing means during a first predetermined range of rotation of the image sensing means and allows the flash means to remain stationary when the image sensing means rotates during a second predetermined range.

63. A digital camera according to claim 35, further comprising:

a switch means for turning the digital camera on when there is rotation of the image sensing means.

64. A digital camera according to claim 63, further comprising:

a second switch means mounted to the body for a user to switch the camera on and off.

65. A digital camera according to claim 64, wherein said switch means which turns the camera on has a function of controlling power to the camera only by turning the camera on.

66. A digital camera according to claim 35, wherein:

an axis of rotation of the image sensing means is at an end portion of the image sensing means.

67. A digital camera according to claim 35, wherein:

an axis of rotation of the image sensing means is at a middle portion of the image sensing means.

68. A method of moving a flash comprising the steps of:

moving an image sensing device which is pivotally connected to a camera body through a first range;

moving a flash mounted to the camera body through a corresponding range; and moving the image sensing device through a second range without moving the flash.

* * * * *